United States Patent [19]

Theriault

[11] Patent Number: 4,920,826

[45] Date of Patent: May 1, 1990

[54] TRANSMISSION APPARATUS

[76] Inventor: Leonard A. Theriault, 22962 96th Avenue, Fort Langley, British Columbia, Canada, VOX 1JO

[21] Appl. No.: 166,934

[22] Filed: Mar. 11, 1988

[51] Int. Cl.$^5$ ............................................. F16H 47/08
[52] U.S. Cl. ........................................ 475/52; 475/53
[58] Field of Search .......................... 74/687, 688, 730

[56] References Cited

U.S. PATENT DOCUMENTS

| | | | |
|---|---|---|---|
| 2,494,466 | 1/1950 | Wolf | 84/688 |
| 2,704,468 | 3/1955 | Horton et al. | 74/688 |
| 2,899,844 | 4/1959 | Hattan | 74/688 |
| 3,500,704 | 3/1970 | Muller et al. | 74/688 |
| 3,518,898 | 7/1970 | Wagner | 74/688 X |
| 3,587,345 | 6/1971 | Johnson | 74/688 |
| 4,120,213 | 10/1978 | Levy | 74/688 |
| 4,408,501 | 10/1983 | Liang et al. | 74/688 |

FOREIGN PATENT DOCUMENTS

997946  1/1952  France .................................... 74/688

Primary Examiner—Dwight G. Diehl
Attorney, Agent, or Firm—Rogers, Bereskin & Parr

[57] ABSTRACT

A transmission apparatus has an epicyclic gear unit and a torque converter. One element of the epicyclic gear unit is connected to one element of the torque converter, and another element of the epicyclic gear is connected to another element of the torque converter. The third element of the epicyclic gear unit is connected to a first shaft. A second shaft is connected to one other element of the transmission apparatus. In a preferred embodiment, a variable ratio is provided between the two shafts, with the torque converter regulating this ratio.

14 Claims, 4 Drawing Sheets

TRANSMISSION APPARATUS

FIELD OF THE INVENTION

This invention relates to transmission apparatus, and more particularly relates to transmission apparatus including an epicyclic gear unit and a torque converter.

BACKGROUND OF THE INVENTION

An epicyclic gear mechanism is one known type of gear mechanism. In the present specification, including the claims, an epicyclic gear unit is a gear unit having first and second gears which are rotatably mounted about respective shafts. A planet carrier is also rotatably mounted and includes at least one planet gear rotatably mounted on the planet carrier. Each planet gear engages both the first and second gears. There are thus three main elements to the epicyclic gear unit, namely the first and second gears and the planet carrier. The rotational speeds of these three elements are related. Whilst the planets can rotate relative to the carrier, no direct connection is made to the planet gears.

Epicyclic gear units can be formed in a variety of different ways. One type of epicyclic gear unit comprises a differential, with the first and second gears connected to two shafts which extend outwards in opposite directions and have a common axis.

Another form of epicyclic gear unit has the second gear formed as an annular gear. The axis of the first and second gears and the planet gears are then all parallel to one another, and the planet gears rotate in an annular space between the first gear and the second, annular gear.

Epicyclic gear units have numerous applications. However, in known arrangements, one of the three rotating elements is either fixed or capable of being fixed, so that a constant, fixed ratio is provided between the other two elements. One common application of epicyclic gear units is in the automatic transmissions of automobiles. Here, various brake bands are provided, to enable one of the elements to be braked or fixed, to cause transmission between the other two elements of the unit. By varying the elements which are fixed, one can obtain a variety of ratios between input and output shafts.

Automatic transmissions for automobiles usually include a torque converter, between the engine and the input shaft of the transmission itself. The torque converter is hydraulic, and includes an impeller and a turbine. The impeller is driven by the engine, and the turbine is driven by the fluid within the torque converter. The design of the various elements is such that, typically, the output shaft speed is less than the input shaft speed, and the torque at the output is a multiple of the torque at the input. The ratio between the input and output shafts varies, depending upon the operating conditions. However, whilst various modifications have been suggested to torque converters, they are always separate from the epicyclic gear units in the automatic transmission.

In my earlier patent application No. 082,618, there is disclosed an epicyclic gear apparatus, which is intended to provide a variable ratio between input and output shafts. However, this is only achieved by providing a third, control shaft which drives a third element of the epicyclic gear unit. As this can provide a variable ratio between the input and output, it does require the provision of a separate control shaft.

SUMMARY OF THE PRESENT INVENTION

What is desirable is an epicyclic gear unit, which can provide a variable ratio between the input and output, without the necessity for any third input.

In the automotive field, it is desirable to have a epicyclic gear unit, which can provide a variable ratio, which varies according to the engine speed and road speed of the vehicle. Ideally, in general, the unit should provide a high ratio at low road speeds, and develop a lower ratio at higher road speeds.

In accordance with the present invention, there is provided a transmission apparatus for providing a variable ratio transmission between first and second shafts, the transmission apparatus comprising: an epicyclic gear unit which comprises a first gear, a second gear, a planet carrier, and at least one planet gear rotatably mounted on the planet carrier and engaging the first and second gears, the first and second gears and the planet carrier forming three elements of the epicyclic gear unit; and a torque converter which comprises an impeller, a turbine and an auxiliary member, which form three elements of the torque converter, wherein one element of the epicyclic gear unit is connected to one element of the torque converter, and one other element of the epicyclic gear unit is connected to one other element of the torque converter wherein at least one of the first and second connections includes a reversing device to reverse the direction and rotation of the two respective elements, whereby both the impeller and the turbine of the fluid coupling rotate in the same direction, and wherein the third element of the epicyclic gear unit is adapted for connection to a first shaft and another of said elements of the epicyclic gear unit and the torque converter is adapted for connection to a second shaft, with any element, which is neither connected to another element nor adapted for connection to one of the first and second shafts, being fixed.

The epicyclic gear unit can have the second gear formed as an annular gear, with the planet gears rotatably mounted in an annulus between the first and second gears. Further, each gear of the planet carrier can comprise a pair of inner and outer planet gears, which engage one another, with the inner gears engaging the first gear and the outer gears engaging the second annular gear. The purpose of this is to ensure that all the elements of the epicyclic gear unit rotate in the same direction.

In the first embodiment of the invention, the first gear of the epicyclic gear unit is connected to a first or input shaft. The planet carrier drives an impeller of a torque converter, with the auxiliary member of the torque converter comprising a fixed, stator. The turbine of the torque converter is connected together with the second, annular gear to a second, output shaft.

In a second embodiment of the present invention, the epicyclic gear unit is formed integrally with a torque converter. Here, a first, input shaft is connected to the first gear of the epicyclic gear unit. The planetary carrier is connected to an impeller of the torque converter, whilst the second, annular gear drives the auxiliary member of the torque converter. The turbine of the torque converter is connected to a second, output shaft.

In its most general form, the present invention has an epicyclic gear unit having three separate elements, and a torque converter, which also has three separate elements. Two of the elements of the epicyclic gear unit are connected to corresponding elements of the torque converter. First and second shafts are connected to two elements, which may be of the epicyclic gear unit or the torque converter. Any element which is not connected to one of the shafts or to some other element is fixed in position.

In a variant of the invention, the torque converter comprises a fluid coupling having just two elements, namely an impeller and a turbine; there is no stator or auxiliary element. Such a fluid coupling simply couples the input and output shafts together, without any speed or torque conversion, whilst permitting slip between the two shafts. This could be suitable for some limited applications.

The transmission apparatus of the present invention is expected to be suited for a variety of applications, including automobile applications. There, it could provide a continuously variable ratio between the input and output. The continuously variable ratio is achieved by the epicyclic gear unit. The torque converter, in effect, controls the ratio provided by the epicyclic gear unit.

BRIEF DESCRIPTION OF THE DRAWINGS

For a better understanding of the present invention and to show more clearly how it may be carried into effect, reference will now be made, by way of example, to the accompanying drawings, in which.

DESCRIPTION OF THE PREFERRED EMBODIMENTS

Figure 1:
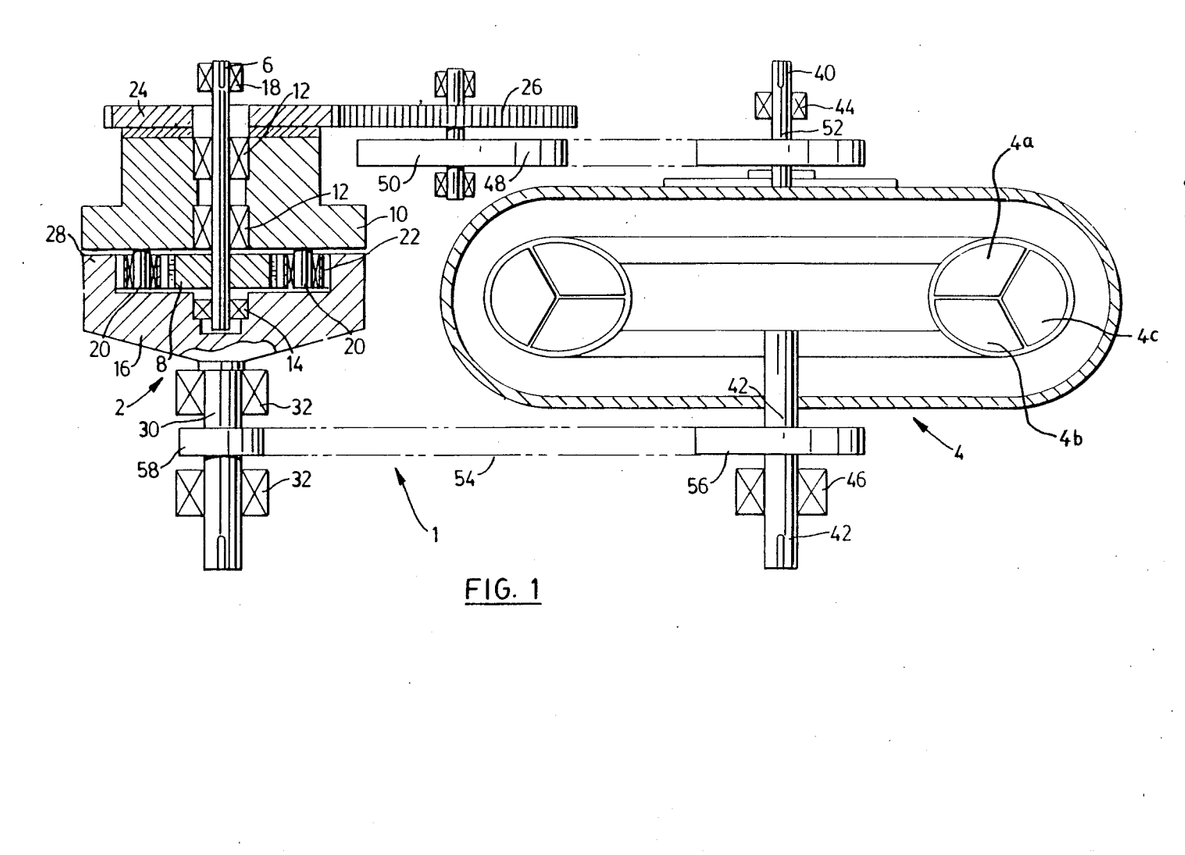
FIG. 1 is a schematic view, in section, of a first embodiment of the transmission apparatus according to the present invention.

Referring first to FIG. 1, a first embodiment of a transmission apparatus according to the present invention is designated by the reference numeral 1. Transmission apparatus 1 is comprised of two principal components, namely an epicyclic gear unit 2 and a torque converter 4.

The epicyclic gear unit 2 has a first shaft 6, which is an input shaft for the apparatus 1. A sun gear 8 is mounted at one end of the input shaft 6.

A planet carrier 10 is mounted by bearings 12 on the input shaft 6. Similarly, one end of the input shaft 6 is mounted in a bearing 14 in an annulus 16. The other end of the shaft 6 can be supported by a further bearing 18.

The planet carrier 10 includes a set of shafts 20 secured to the planet carrier 10. Planet gears 22 are mounted on the shafts 20. Each planet gear 22 meshes with the sun gear 8 and with the annulus 16 whose inner periphery is formed as an annular gear 28.

A second, output shaft 30 is supported in bearings 32 and is integral with the annulus 16.

The torque converter 4 includes an input shaft 40 and an output shaft 42 mounted in respective bearings 44, 46.

A gear 24 is mounted with the carrier 10 on the input shaft 6. The gear 24 drives another gear 26, thereby reversing the direction of rotation of the drive. The gear 24 is connected to a pulley or sprocket 50 and mounted in appropriate bearings. An input drive connection 48 is any suitable drive, for example either a belt drive or a chain drive. As shown, the input drive connection 48 connects the driver pulley/sprocket 50 to a driven sprocket/pulley 52 on the input shaft 40 of the torque converter. The sprocket 50 is larger than the sprocket 52, to cause the input shaft 40 to be rotated at a higher speed than the shaft 6 and in the opposite direction.

The input shaft 40 of the torque converter 4 is connected to the impeller of the torque converter 4. The turbine of the torque converter 4 is connected to the output shaft 42. An auxiliary element of the torque converter 4 is formed as a stator which is fixed. For simplicity, the torque converter 4 is shown in outline, with the impeller, turbine and stator being shown schematically and indicated at 4a, 4b and 4c. The torque converter 4 can be largely or wholly conventional, and can be a fluid coupling with no stator.

A corresponding drive connection 54 is provided between the output shaft 42 and the second, output shaft 30 of the gear unit 2. Corresponding drive sprockets/pulleys 56, 58 are provided on the shafts 42 and 30 respectively. Again, the sprocket/pulley 56 is bigger than the sprocket/pulley 58, to give a desired speed ratio between them.

In use, an input drive would be connected to the input shaft 6 of the epicyclic gear unit 6, and an output would be taken from the second, output shaft 30. For example, in an automobile or other vehicle, the input shaft 6 would be connected to the engine, and the output shaft 30 would be connected to a final drive for the vehicle.

Considering the behaviour of the transmission 1, commencing from a stationary position, initially as the input shaft 6 is rotated, the planet carrier 10 will be rotated in the same direction, with no rotation of the annulus 16. This rotation of the planet carrier causes the input shaft 40 of the torque converter 4 to rotate. Thus, the drive input at the shaft 6 is exhausted to the input of the torque converter 4. The torque converter 4 permits this exhaustion of the input up to a certain velocity. Above this velocity, there is significant coupling through the torque converter 4. As a practical matter, there will usually be some coupling through the torque converter 4, so that there will be some torque transmission through the unit 1, even with the vehicle stationary.

With the shaft 6 rotating at a greater speed, the input shaft 40 of the torque converter 4 will resist acceleration to higher speeds. Consequently, the annulus 16 will commence rotation in the opposite direction to the input shaft 6. Simultaneously, drive will be transferred through the torque converter 4, and then through the output drive connection 54 to the output shaft 30.

The effective ratio of the whole transmission 1 is the ratio between the speeds of the input and output shafts 6, 30. This will vary depending upon a number of parameters. Thus, for example when the power supplied to the shaft 6 is suddenly increased, with the output shaft 30 being at essentially a constant speed, then initially the shaft 6 and the carrier 10 will accelerate. This causes more drive transfer through the torque converter 4 to the output shaft 30. This thus gives a slightly higher ratio between the shafts 6, 30, which is what is required for acceleration. However, when the power supplied to the input shaft 6 is decreased, then the converter 4 on the carrier 10 will slow down. This gives a lower ratio, for cruising, etc.

Effectively, the torque converter 4 principally acts as a governor for the carrier 10 of the epicyclic gear unit 2. The variation in effective gear ratio of the apparatus 1 could be from 50:1 or greater to 2:1.

If one considers the case where wheel spin occurs with an automobile, this typically occurs at a low speed and high ratio. In conventional vehicle transmissions, the gear ratio remains the same immediately after wheel spin occurs; however, since the engine RPM increases greatly, this increases the power and can add to the spin problem. With the transmission 1, should wheel spin occur, the output shaft 30 will increase in speed, causing a reduction in the gear ratio although very little change in engine RPM. This reduction gear ratio reduces the HP applied to the shaft 30, and hence the HP may fall below that needed to maintain the wheel spin.

A description will now be given with reference to FIGS. 3 and 4 of test results obtained using a transmission apparatus generally as shown in FIG. 1. As a practical matter, in the test apparatus, additional shafts and belt drives were included, but the arrangement was mechanically equivalent to that shown in FIG. 1. The test was carried out using a fluid coupling for the converter or fluid coupling 4. The fluid coupling was a Dana model 9.4 HCM, with a number 9 fill. The epicyclic unit 2 had a sun gear 8 with 28 teeth, planet gears 22 with 17 teeth and a ring gear 28 with 62 teeth. The ratio provided by the drive connection 48 between the shafts 6, 40 was 5:1. The ratio provided by the drive connection 54 between the output shafts 42, 30 was 2:1. This thus gives an overall ratio of 10:1 between the input and output shafts 6, 30 for zero slip in the fluid coupling 4. The gear dimensions of the planetary unit 2 give it a basic planetary ration 2.2:1 approximately.

Figure 3:
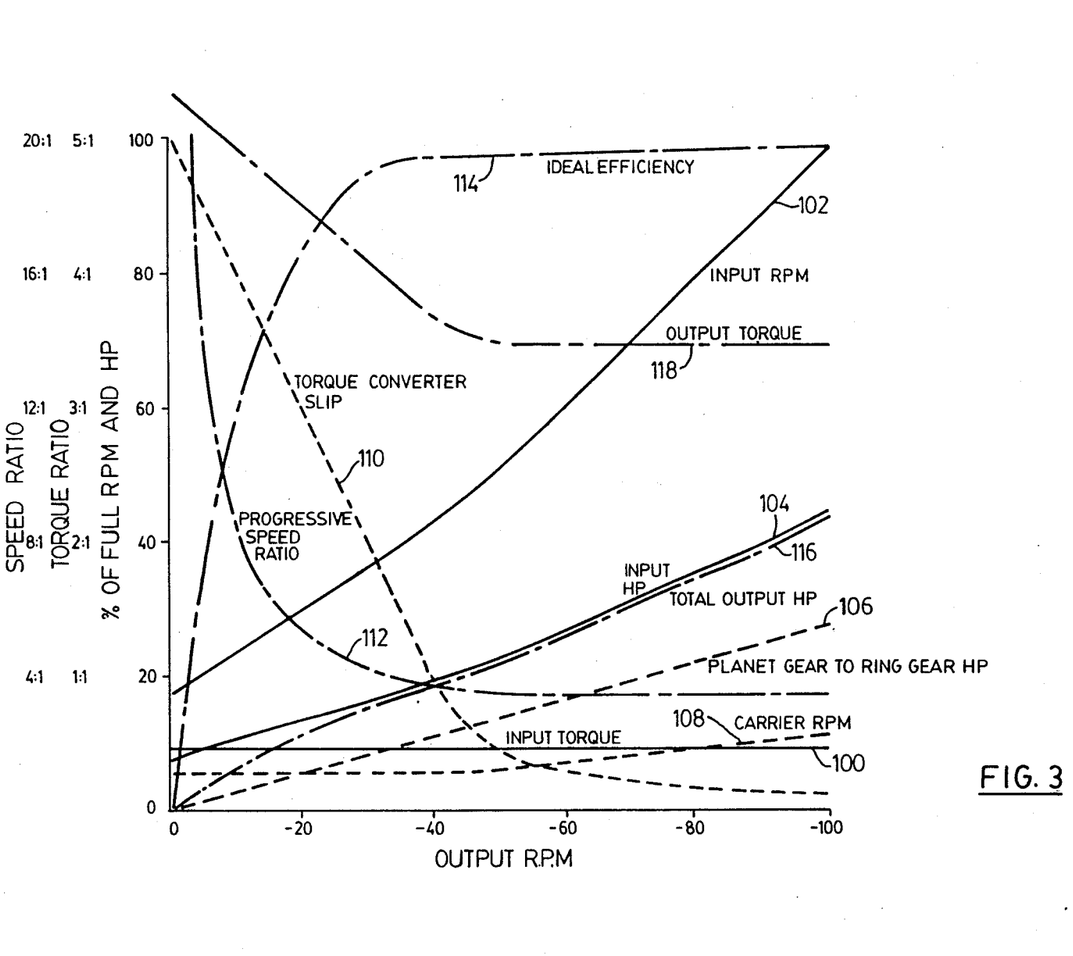
FIGS. 3 and 4 are graphs showing the variation of various parameters under partial load and full load conditions respectively.
Figure 4:
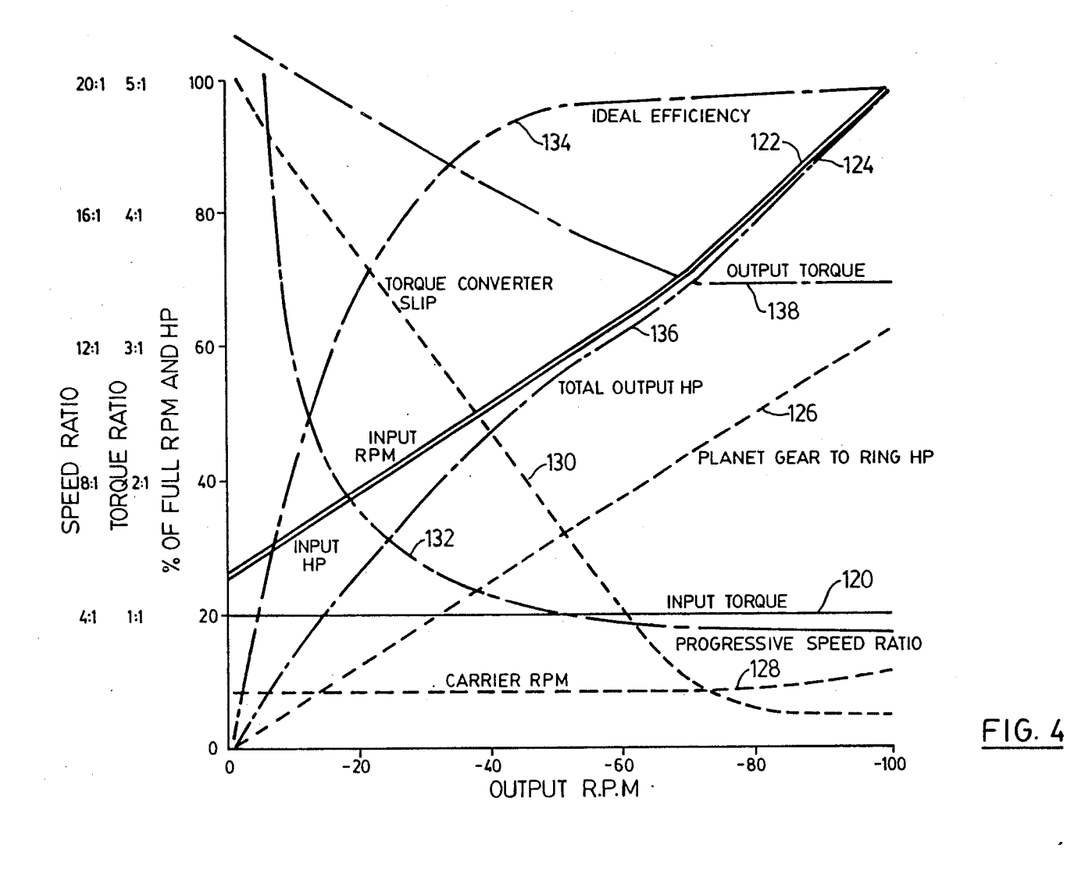

Reference will now be made to FIGS. 3 and 4, which show typical characteristics of the transmission 1. These graphs show variations of various parameters, as detailed below, for partial power and full power conditions.

Referring first to FIG. 3, the horizontal axis shows the output RPM as a percentage of maximum output RPM; a negative sign is attached to these percentages, since the output shaft 30 is rotating in the opposite direction to the input shaft 6. On the vertical axis, there are three scales, one for the speed ratio, a second for the torque ratio at the torque converter 4, and a third covering both the horsepower and the speed as a percentage of full speed.

As can be seen, the input torque was maintained constant. It is shown as a line approximately half way between the zero and 1:1 torque ratio, indicating that the input torque was approximately half of the full power torque (see FIG. 4). The input torque line is shown at 100. At 102, there is the line showing the input RPM as a percentage of the RPM at the maximum output RPM. As can be seen, the input RPM increases slowly until about 40 percent of the output RPM is reached, and then increases at a more rapid rate. The combination of the input torque 100 and input RMP 102 give the input horsepower line 104.

The horsepower delivered to the input sun gear 8 is split between the power transmitted through the torque converter 4 and the power transmitted to the annular gear 28. By calculation, the horsepower transferred to the ring gear 28 from the planet gears is shown at 106.

The RPM of the planet carrier 10 is shown at 108. This characteristic is of some interest. As can be seen, although the input RPM covers a considerable range, as does the output RPM, the carrier RPM remains remarkably constant. It starts at slightly more than five percent of the full input RPM, and increases to a value slightly more than ten percent of the full input RPM. Most of this increase occurs after 40 percent of the output RPM speed has been reached. This characteristic is interesting, because it shows that initially a greater proportion of the input is transferred through the torque converter, where a torque multiplication occurs. As the input speed increases, the torque converter input speed does not increase significantly, this being tied to the carrier speed. As the input speed increases therefor, the output shaft 30 increases in speed, and the torque converter slip decreases.

The torque converter slip is shown by the line 110, and as can be seen, this starts at nearly 100 percent slip and decreases rapidly to 20 percent slip at 40 percent of the output RPM. The slip then falls off more slowly, and it is at this point that the carrier RPM starts to rise. This gives the progressive speed ratio between the input and the output shown by the line 112. As expected, the speed ratio starts out very high, and then falls rapidly. It is below 6:1 at 20 percent of the output RPM and below 4:1 at 40 percent of the output RPM. Thereafter, the speed ratio remains nearly constant. The speed ratio and torque converter slip characteristics 110, 112 are also related to the efficiency shown by the line 114. As can be seen, from a stationary position, there is high slip resulting in low efficiency. However, the efficiency rises rapidly. Above 30 percent of the output RPM, the efficiency is above 95 percent, and close to 100 percent. This is also reflected in the total output horsepower line 116. As shown, above 40 percent of the output RPM, the line 116 closely tracks the input horsepower 104. Below 40 percent output RPM, the line 116 falls, reflecting the poorer efficiency.

The output torque is shown by the line 118. As can be seen, the output torque is high at zero output and lower output speeds, as desired. This is as expected by the torque converter slip characteristic 110. The output torque falls fairly steadily until a speed somewhat in excess of 40 percent output RPM. The output torque 118 is then roughly constant for the higher output speeds, corresponding to the low slip characteristics of the torque converter at these speeds.

Referring to FIG. 4, here full power was applied, and this is shown by the input torque line 120. The input torque line is shown at a torque ratio of 1:1, indicative of full power. As a consequence, the input RPM starts at a higher percentage of full input RPM, namely approximately 25 percent of the full input RPM. The input RPM, line 122, then increases at a fairly steady rate until approximately 70 percent of the full output RPM, and then the input RPM rises somewhat more quickly. The input horsepower line, as expected for a constant torque characteristic, closely tracks the input RPM line 122 and is shown at 124. Again, the carrier RPM remained remarkably constant, and this characteristic is shown at 128. The carrier RPM was at a higher level, closer to 10 percent of the full input RPM, and remained approximately constant until nearly 80 percent of full output power. At this point it climbed slightly. The torque converter slip is shown by the line 130. Because of the higher power, the slip remains at a higher level, and did not fall off as quickly as for the partial power characteristics. Thus, again commencing from 100 percent slip, the torque converter slip falls fairly consistently until about 70 percent of the output power, as opposed to around 50 percent for the partial power case. The torque converter slip was then constant at a low percentage between 80 and 100 percent of the full output RPM.

The progressive speed ratio, shown by line 132, again shows a slower fall off. Thus, a speed ratio of 4:1 is only reached at approximately 50 percent of output RPM, as opposed to an output RPM closer to 30 percent in the partial power case of FIG. 3. Above 50 percent of output RPM, the progressive speed is roughly constant and falls slightly to a value below 4:1.

The slower fall off in the torque converter slip characteristic 130 is reflected in the ideal efficiency curve 134. This climbs more slowly, and only reaches the 90 percent level at just below 40 percent of the output RPM. Thereafter, the ideal efficiency levels off to values somewhat in excess of 95 percent.

The total output horsepower is shown by the line 136. Again, reflecting the slower climb in the ideal efficiency, the total output horse power climbs slowly and only reaches a value close to the input horsepower line 122 at approximately 50 percent of the output RPM. Again, by calculation, the planet gear 2 ring gear horsepower is shown by the line 126, as can be seen this is approximately straight. This characteristic shows that the percentage of power transferred to the annular gear 28 is small at lower output speeds and increases until it represents approximately three quarters of the power. Correspondingly, there is a higher slip at low speeds, indicative of the higher power transfer through the torque converter 4.

Comparison of FIGS. 3 and 4 will show some similarities. Thus, both graphs show kinks in the input RPM characteristic 102, 122, corresponding to a curve in the output torque characteristics 118, 138. However, at partial power, this change occurs at roundabout 40–50 percent of the output speed, whereas at the full power, this change occurs more clearly at around 70 percent of the output RPM. Simultaneously with this change in the input RPM and output torque, the torque converter slip characteristic 110, 130 fell too close to its lowest value. The other characteristic curves correspond.

Thus, at partial power, significant slip occurs only at the lower speed ranges, and one gets a fairly constant output torque from 50 percent of output RPM upwards. This is a desirable characteristic for automotive or other applications. For full power applications, as desired, the output torque is maintained higher to a higher output speed, namely approximately 70 percent of output RPM. It is only at the very high output RPMs that the torque converter slip falls off to negligible values and the output torque settles at a roughly constant level. This again is a desirable characteristic.

Figure 2:
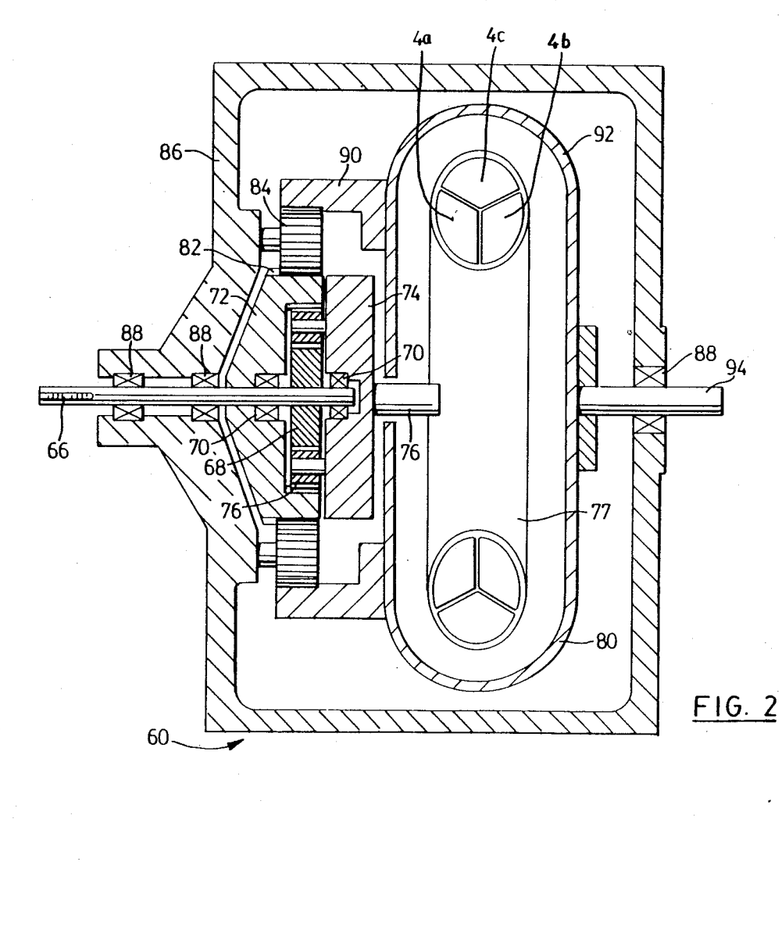
FIG. 2 is a schematic view, in section, of a second embodiment of the transmission apparatus.

Referring now to FIG. 2, a description will be given of a variant of the present invention. Here, the torque converter or fluid coupling is integral with the epicyclic gear unit. This second embodiment of the transmission apparatus is denoted by the reference 60. The transmission apparatus 60 has an input shaft 66 connected to a sun gear 68. Bearings 70 mount the shaft 66 in an annulus 72 and in a planet carrier 74. Planets 76 are mounted on shafts secured to the planet carrier 74 in known manner. The planet carrier 74 is attached by means of a shaft 76 to the impeller of a fluid coupling 80. As for the first embodiment, the fluid coupling could be replaced by a torque converter, with a stator fixed in known manner.

The planets 76 comprise inner planets. These planets 76 together with the sun gear 68, planet carrier 74 and annulus 72 comprise an inner epicyclic gear unit.

The annulus 72 is formed with a toothed outer periphery, as indicated at 82, and consequently forms the sun gear of an outer epicyclic gear unit. Outer planetary gears 84 are mounted on shafts secured to an external housing of the whole transmission apparatus 60. The outer housing 86 is mounted by means of bearings 88 on the input shaft 66 and on the output shaft. An outer annulus 90 is secured to the outer housing of the turbine 92 of the fluid coupling 80. The turbine 92 is also connected to an output shaft 94.

In use, this transmission apparatus 60 functions similarly to the embodiment of FIG. 1. Thus, with an input supplied through the shaft 66, the sun gear 68 is rotated. This causes the planet carrier 74 and hence the impeller 77 to rotate in the same direction.

The annulus 72 is caused to rotate in the opposite direction. However, the arrangement of the outer planetary including the planets 84 effectively reverses this rotation, as the housing 86 is fixed. The annulus 90 then connects this drive through to the turbine 92 and output shaft 94. Thus, the overall arrangement is similar to FIG. 1.

It is expected that these types of characteristics will be well suited to automotive applications. The apparatus will allow engine speed to climb to operating speed quite readily, but then tend to hold a slower progression or ratio change from mid range to high ratios.

It will be appreciated that there are various advantages to the transmission apparatus 1. The overall construction is simple, and has relatively few components. It does not necessitate numerous epicyclic gear mechanisms, with various brake bands, clutches and alternative routes for the drive. This should make it compact. No control is necessary to accomplish the gear progression or ratio change, other than variations in the input torque and speed. The planetary gear selection will determine the curve rate and the progression required for each application. By comparison, with modern C.V.T., an electric or hydraulic control must include many sensors for speed and torque, all of which are controlled by a complex system. Further, there are power losses due to friction of the belt drive, and it is effectively limited to lightweight vehicles. The present mechanism requires no operator input or complex control system. It should be capable of being sized to suit a variety of different operations.

As is known, particularly in conventional automobile transmissions, the torque converter or fluid coupling can be provided with a lock up device to give a fixed 1:1 ratio between input and output. Similarly, the transmission apparatus of the present invention can be provided with a lock up device to give a fixed ratio between input and output. In the FIG. 1 version, where input and output are rotating in opposite directions, this could be provided in the fluid coupling or converter, to effectively give a fixed ratio through the epicyclic gear unit. Preferably, in the FIG. 2 version, it is provided between the output and the carrier 74. This would again give a fixed ratio through the epicyclic gear unit. The lock up could be actuated once a certain output speed is reached, although the mode of operation will depend on the particular use. This will then give a fixed ratio through the apparatus.

I claim:

1. A transmission apparatus for providing a variable ratio transmission between first and second shafts, the transmission apparatus comprising: an epicyclic gear unit which comprises a first gear, a second gear, a planet carrier, and at least one first planet gear rotatably mounted on the planet carrier and engaging the first and second gears, the first and second gears and the planet carrier forming three elements of the epicyclic gear unit; and a fluid coupling which comprises only an impeller and a turbine as two elements of the fluid coupling; wherein one element of the epicyclic gear unit is connected by a first connection to one element of the fluid coupling, and one other element of the epicyclic gear unit is connected by a second connection to the other element of the fluid coupling, wherein at least one of the first and second connections includes a reversing device to reverse the direction of rotation of the two respective elements, whereby both the impeller and the turbine of the fluid coupling rotate in the same direction, and wherein the third element of the epicyclic gear unit is adapted for connection to a first shaft and another of said elements of the epicyclic gear unit and the fluid coupling is adapted for connection to a second shaft.

2. A transmission apparatus as claimed in claim 1, wherein the second gear of the epicyclic gear unit comprises an annular gear surrounding and coaxial with the first gear, and the epicyclic gear unit includes a plurality of first planet gears uniformly distributed between the first gear and second, annular gear.

3. A transmission apparatus as claimed in claim 2, wherein the epicyclic gear unit and the fluid coupling are integral with one another and coaxial, and wherein said another of said elements of the epicyclic gear unit and the fluid coupling is adapted for connection to an output shaft.

4. A transmission apparatus as claimed in claim 3, wherein the planet carrier is connected to the impeller of the fluid coupling, the second, annular gear is connected to the turbine of the fluid coupling, the first gear is connected to an input shaft, and an output shaft is connected to the turbine of the fluid coupling.

5. A transmission apparatus as claimed in claim 1, wherein the planet carrier is mechanically coupled to the impeller of the fluid coupling by the first connection, the second, annular gear is mechanically coupled to the turbine of the fluid coupling by the second connection, the first gear is adapted for connection to the first shaft, and the annular gear is adapted for connection to the second shaft.

6. A transmission apparatus as claimed in claim 1, wherein the first and second connections each comprise one of a belt drive and a chain drive.

7. A transmission apparatus as claimed in claim 1, 5 or 6, wherein the reversing device is incorporated in the first connection and comprises a transfer gear secured to one of said one element of the epicyclic gear unit and said one element of the fluid coupling, and an intermediate gear meshing with the transfered gear and connected to the other of said one element of the epicyclic gear unit and the fluid coupling.

8. A transmission apparatus for providing a variable ratio transmission between first and second shafts, the transmission apparatus comprising: an epicyclic gear unit which comprises a first gear, a second annular gear surrounding and coaxial with the first gear, a planet carrier, and a plurality of first planet gears rotatably mounted on the planet carrier and engaging the first and second gears, the first and second gears and the planet carrier forming three elements of the epicyclic gear unit; and a fluid coupling which comprises an impeller and a turbine as two elements of the fluid coupling; wherein the planet carrier is mechanically coupled to the impeller of the fluid coupling by a first connection, the second, annular gear is mechanically coupled to the turbine of the fluid coupling by a second connection, the first gear is adapted for connection to the first shaft, and the annular gear is adapted for connection to the second shaft, wherein at least one of the first and second connections includes a reversing device to reverse the direction of rotation of the two respective elements, whereby both the impeller and the turbine of the fluid coupling rotate in the same direction, and wherein the first and second connections are such that, with the impeller and turbine rotating at the same speed, the annular gear rotates at a higher speed than the planet carrier, with any element, which is neither connected to another element nor adapted for connection to one of the first and second shafts, being fixed.

9. A transmission apparatus as claimed in claim 8, wherein the fluid coupling is formed as a torque converter including an auxiliary member as a third element of the torque converter, with any element of the torque converter which is neither connected to an element of the epicyclic gear unit nor adapted for connection to one of the first and second shafts being fixed.

10. A transmission apparatus as claimed in claim 9, wherein the auxiliary member comprises a stator which is fixed and not connected to any element of the epicyclic gear unit.

11. A transmission apparatus as claimed in claim 8, 9, 10, wherein the reversing device is incorporated in the first connection and comprises a transfer gear secured to one of said planet carrier and said impeller, an intermediate gear meshing with the transfer gear, and one of a belt device and chain drive connecting the transfer gear to the other of said planet carrier and said impeller.

12. A transmission apparatus for providing a variable ratio transmission between first and second shafts, the transmission apparatus comprising: an epicyclic gear unit which comprises a first gear, a second, annular gear surrounding and coaxial with the first gear, a planet carrier, and a plurality of first planet gears rotatably mounted on the planet carrier and engaging the first and second gears, the first and second gears and the planet carrier forming three elements of the epicyclic gear unit; and a fluid coupling which comprises an impeller and a turbine as two elements of the fluid coupling which fluid coupling is integral and coaxial with the epicyclic gear unit; wherein the planet carrier is connected to the impeller of the fluid coupling by a first connection, the second, annular gear is connected to the turbine of the fluid coupling by a second connection, the first gear is connected to the first, input shaft, and a second, output shaft is connected to the turbine of the fluid coupling, wherein the annular gear includes a toothed external periphery, and a plurality of second, outer planet gears are provided engaging that external periphery, and mounted on fixed shafts, and a third, outer annular gear engages the second outer planet gears and is attached to the turbine, said toothed external periphery, second, outer planet gears and third, outer annular gear forming the second connection, and wherein any element which is neither connected to another element nor adapted for connection to one of the first and second shafts is fixed.

13. A transmission apparatus as claimed in claim 12, which includes a fixed outer housing, wherein the first, input shaft is rotatably mounted in bearings in the outer housing, and the first gear, the second, annular gear, the first planet gears, the second, outer planet gears and the third, outer annular gear are all located within the outer housing, with the shafts of the outer planet gears secured to the outer housing.

14. A transmission apparatus as claimed in claim 12 or 13, wherein the fluid coupling comprises a torque converter, including a stator that is fixed.

* * * * *